United States Patent [19]

Jaeger et al.

[11] Patent Number: 5,312,604
[45] Date of Patent: May 17, 1994

[54] WORK-UP OF WASTE MATERIALS FROM BARIUM OR STRONTIUM SULFIDE LEACHING

[75] Inventors: Paul Jaeger; Hans-Hermann Riechers, both of Bad Hoenningen; Karl Koehler, Diekholzen; Martin Wulff, Bad Hoenningen, all of Fed. Rep. of Germany

[73] Assignee: Kali-Chemie AG, Hanover, Fed. Rep. of Germany

[21] Appl. No.: 988,020

[22] Filed: Dec. 9, 1992

Related U.S. Application Data

[63] Continuation of Ser. No. 704,933, May 23, 1991, abandoned.

[30] Foreign Application Priority Data

May 31, 1990 [DE] Fed. Rep. of Germany ....... 4017530

[51] Int. Cl.$^5$ ............................................. C01F 11/46
[52] U.S. Cl. .................................... 423/155; 423/170; 423/178; 423/554
[58] Field of Search ............... 423/155, 156, 157, 158, 423/166, 170, 172, 178, 554

[56] References Cited

U.S. PATENT DOCUMENTS

| | | | |
|---|---|---|---|
| 1,458,461 | 6/1923 | Ayers | 423/170 |
| 2,005,296 | 6/1935 | Muller | 423/170 |
| 2,039,432 | 5/1936 | McCallum | 423/170 |
| 2,052,436 | 8/1936 | Wysor | 423/172 |
| 2,285,242 | 6/1942 | Weber et al. | 23/122 |
| 3,809,742 | 5/1974 | Simoleit et al. | 423/155 |

FOREIGN PATENT DOCUMENTS 3213517  10/1983  Fed. Rep. of Germany .

OTHER PUBLICATIONS

Ullmann's Encyclopedia of Industrial Chemistry, 5th Ed., vol. A3, pp. 325, 332–333 and 341 (1985) (no date avail.).

Kirk-Othmer Encyclopedia of Chemical Technology, 3rd. Ed., vol. 3, pp. 476–479 (no date avail.).

Sickert et al., "Whitening barite flotation concentrates", Chemical Abstracts 79:68257a (no date avail.).

Shono et al., "Fine barium sulfate containing no sulfide", Chemical Abstracts 104:36324p (no date avail.).

*Primary Examiner*—David Brunsman
*Attorney, Agent, or Firm*—Evenson, McKeown, Edwards & Lenahan

[57] ABSTRACT

A process for working-up waste materials from barium sulfide or strontium sulfide leaching in which the amount of waste material to be disposed of is substantially decreased.

8 Claims, No Drawings

WORK-UP OF WASTE MATERIALS FROM BARIUM OR STRONTIUM SULFIDE LEACHING

This application is a continuation of application Ser. No. 07/704,933, filed May 23, 1991 now abandoned.

BACKGROUND OF THE INVENTION

This invention relates to a process for working-up waste materials from barium sulfide leaching or strontium sulfide leaching.

Barium sulfide leaching is a process step in the preparation of barium compounds from naturally occurring starting material, i.e. heavy spar (barite). Heavy spar contains approximately 92 to 98% by weight of barium sulfate and additional variable quantities of calcium and iron salts, as well as silicate. The ground heavy spar is mixed with finely ground carbon and is reduced to barium sulfide at elevated temperatures (approximately 1200° C.). The cooled melt containing barium sulfide is extracted with hot water to form barium sulfide lye. The barium sulfide lye obtained by this barium sulfide leaching is an intermediate product in the preparation of many different organic and inorganic barium compounds. The lye is subjected to further reactions in order to form these compounds. For example, barium carbonate can be prepared in this manner by introducing carbon dioxide. Barium carbonate is used in the glass industry.

Barium sulfide leaching leaves a residue. This residue for the most part contains barium salts, and also iron and calcium salts, particularly in the form of silicates and sulfides.

The preparation of strontium compounds is comparable to the preparation of barium compounds from barium sulfate. In this case, the starting material is the naturally occurring mineral celestite, which consists essentially of strontium sulfate. The extraction of strontium compounds from this mineral is comparable to the extraction of barium compounds described above. The ground celestite is mixed with carbon, reduced to strontium sulfide at elevated temperatures, and then the cooled melt is extracted with hot water. A strontium sulfide lye is formed. This strontium sulfide lye obtained by strontium sulfide leaching is an intermediate product in the preparation of many different strontium compounds. By far the largest part of this lye is reacted further to strontium carbonate, e.g. by introducing carbon dioxide. Strontium carbonate is used on a large scale for television picture tubes.

Strontium sulfide leaching also leaves a residue.

SUMMARY OF THE INVENTION

It is the object of the invention to provide an advantageous and simple process for working-up waste materials from barium sulfide leaching or strontium sulfide leaching.

It is also an object of the invention to provide a process for working-up waste materials from barium or strontium sulfide leaching which is well suited for large-scale application.

Another object of the invention is to provide a process for working-up waste materials from barium or strontium sulfide leaching which enables partial or complete utilization of such waste materials and reduces the amount of waste material which needs to be disposed of.

These and other objects of the invention are achieved by providing a process for working-up a waste leaching residue from barium sulfide leaching or strontium sulfide leaching, said process comprising reacting said waste leaching residue with a hydrochloric acid containing approximately 25 to 32% by weight of HCl and a sulfuric acid containing approximately 80 to 100% by weight of $H_2SO_4$ at a temperature in the range from 60° C. to the boiling point of the reaction mixture to form an acid solution and a solid; and separating said acid solution from said solid.

DETAILED DESCRIPTION OF PREFERRED EMBODIMENTS

The process according to the invention for working-up waste materials from barium sulfide leaching or strontium sulfide leaching, in which the waste material is reacted with sulfuric acid to form an acid solution and a solid and the acid solution is separated from the solid, is characterized in that a hydrochloric acid containing approximately 25 to 32% by weight of HCl and a sulfuric acid containing approximately 80 to 100% by weight of $H_2SO_4$ are used to form the acid solution, and in that the reaction of the leaching residues with hydrochloric acid and sulfuric acid is carried out at a temperature of between 60° C. and the boiling point. If desired, the separated solid can be treated with an alkali. The acid solution and the solid can be neutralized, if desired, and can be dewatered, if desired.

The hydrochloric acid and sulfuric acid can be added to the leaching residues at the same time. It is thus possible to add a hydrochloric acid containing sulfuric acid. However, the residue is preferably reacted initially with hydrochloric acid, and sulfuric acid is added subsequently.

If desired, the sulfuric and/or hydrochloric acid may contain sulfate or hydrogen sulfate salts, particularly of alkali metals. The addition of sulfate salts is preferably avoided.

The sulfate or sulfuric acid is advantageously added in at least the quantity required for complete precipitation of the barium or strontium contained in the residue as barium or strontium sulfate. It is also possible to use smaller quantities of sulfate or sulfuric acid, but the effectiveness of the process according to the invention is then lower.

Sulfate or sulfuric acid can also be used in greater quantities than stoichiometrically required for barium or strontium precipitation. Particularly good results are obtained when sulfuric acid is added in a quantity of 1.02 to 1.1 times the stoichiometrically required amount.

The use of concentrated hydrochloric acid, which contains hydrochloric acid in a concentration of 30 to 32% by weight, and of concentrated sulfuric acid, which contains sulfuric acid in a concentration of 92 to 97% by weight, is particularly advantageous from the technical point of view.

The hydrochloric acid is advantageously added in at least the quantity stoichiometrically required to dissolve the calcium and iron contained in the residue. The effectiveness is lower if hydrochloric acid is used in a quantity lower than the stoichiometrically required amount. However, the hydrochloric acid can also be used in quantities higher than those stoichiometrically required. Particularly good results are obtained when the hydrochloric acid is used in a quantity 1.01 to 1.1 times the amount stoichiometrically required to dissolve the calcium and iron content of the residue. The reaction components are advantageously thoroughly mixed.

The reaction of the leaching residue with mineral acid and the preferred aqueous sulfuric acid is preferably carried out at temperatures of between 65° C. and 100° C. In addition to the thermal energy released by the exothermic reaction, the reaction mixture can appropriately be heated.

The duration of the reactions between the leaching residue and the hydrochloric acid and/or sulfuric acid can be varied within broad limits. Good results are obtained when the reaction is carried out over a total period of 15 minutes to 3 hours. The reaction can of course be carried out for shorter periods, or even for longer periods of up to 24 hours and more.

Because of apparatus considerations, the process is preferably carried out at standard pressure (ambient pressure), although if appropriate equipment is used, it is, of course, also possible to work at reduced or elevated pressures.

When the leaching residue is reacted with acid, liberated hydrogen sulfide is withdrawn and can be worked up, e.g. to sulfur. The release of hydrogen sulfide can be further increased by means of stripping.

During the reaction, an acid solution and a solid form in the reactor. After the reaction of the leaching residue with hydrochloric acid and sulfuric acid, the acid solution is separated from the solid. Known methods known are used for this; for example, it is possible to use filtering, centrifuging or decanting.

When using barium sulfide leaching residue, the separated solid, which may also be washed with water, consists essentially of barium sulfate and silicon dioxide. It can be used filter-moist or dry, as desired. In particular, it can be returned to the barium sulfate reduction. According to a variant embodiment described hereinafter, it can also be further processed.

When using strontium sulfide leaching residue, the solid essentially consists of strontium sulfate. This residue too can be returned to the sulfate reduction or can be further processed.

The aqueous acid solution essentially contains the iron and calcium constituents of the leaching residue. The use of hydrochloric acid accordingly results in an aqueous solution of iron chloride and calcium chloride, as well as the corresponding sulfates. The mixture of iron chloride and calcium chloride remaining after concentration or drying of the solution, if desired, or after separation of the acid, can be used as a flocculating agent or as a precipitating agent, e.g. for phosphates, in waste-water purification.

In a preferred embodiment of the process according to the invention, the solid which is produced following the acid treatment and which consists essentially of barium sulfate or strontium sulfate and silicon dioxide, is processed still further. To this end, the solid is treated with an aqueous alkali solution, thereby dissolving soluble constituents. An alkaline extract solution and an extraction residue are formed. This embodiment is characterized in that the solid separated from the acid solution is treated with an aqueous alkali solution to form an alkaline extract solution and an extraction residue and the alkaline extract solution is separated from the extraction residue.

Although the concentration of the alkali solution used can vary within a wide range, e.g. between 1% by weight and the saturation limit, it advantageously lies between approximately 15 and 50% by weight. Sodium hydroxide solution is particularly suitable.

Although the reaction of the solid with the alkali solution upon treatment can be effected at temperatures of between approximately 10° C. and the boiling point, it is preferably carried out at temperatures in excess of approximately 50° C. Temperatures between approximately 80° C. and the boiling point of the reaction mixture are particularly preferred.

Leaching with the alkali solution can be carried out at standard pressure (1 atm). It is possible, if desired, to work at an elevated pressure, e.g. at a pressure of up to about 5 bar, and at a temperature of up to 160° C. or more. In that case, pressure-resistant apparatus (autoclaves) are used. If suitable equipment is used, it is also possible to work at pressures even higher than 5 bar and/or at temperatures higher than 160° C.

After the reaction, the alkaline extract solution contains silicon dioxide in the form of dissolved sodium silicate. The alkaline solution is separated from the alkali-insoluble solid consisting essentially of barium sulfate or strontium sulfate by known methods, e.g. by filtering, centrifuging or decanting.

The alkaline solution containing alkali silicate can be used as a water glass solution or, if desired, after drying, for producing silica gel. If desired, after drying, the alkali-insoluble solid can be returned to the appropriate sulfate reduction. Therefore, in this variant of the process according to the invention, it is possible to completely utilize the waste material from barium sulfide leaching or from strontium sulfide leaching.

Unless it is necessary to utilize the iron- and calcium-containing acid solution or the alkali silicate solution, the respective solution can of course also be neutralized, more or less dried and the resulting residue can be disposed of.

Unless there is call for the utilization of the iron-and calcium-containing acid solution or the utilization of the alkali silicate solution, the two solutions are advantageously mixed. Optionally, they are neutralized and the resulting residue is disposed of. The residue can be disposed of filter-moist or more or less dry.

This advantageous embodiment of the process according to the invention is characterized in that a hydrochloric acid containing approximately 25 to 32% by weight of HCl and a sulfuric acid containing approximately 80 to 100% by weight of $H_2SO_4$ are used, the reaction of the leaching residues with hydrochloric acid and sulfuric acid is carried out at a temperature of between 60° C. and the boiling point, the solid separated from the acid solution is treated with an aqueous alkali solution to form an alkaline extract solution and an extraction residue, the alkaline extract solution is separated from the extraction residue, the separated acid solution is mixed with the separated extract solution, and the mixed solution is then neutralized and dewatered.

Even in this embodiment of the process according to the invention, in which only the barium or strontium content of the leaching residue is utilized, the quantity of material to be disposed of is still significantly decreased, i.e. by up to 90% by weight.

In accordance with the process according to the invention, it is therefore possible in a technically advantageous and simple manner to utilize the larger part, or even all, of the residue resulting from the leaching of barium sulfide or strontium sulfide and to decrease the quantity of material to be disposed of.

The process according to the invention will now be described in more detail by the following example, without limiting its scope. The stated percentage values refer to percent by weight.

EXAMPLE 8.9 t of moist leaching residue containing approximately 55% $H_2O$ were mixed in a heated, stirred vessel with 3.8 t of $H_2O$. 750 kg of HCl (32%) and 880 kg of $H_2SO_4$ (96%) were added with stirring. The resulting hydrogen sulfide was absorbed in a gas washer with barium sulfide (BaS) lye.

After stirring for 2 hours at 70° C., the suspension was filtered in a filter press. 6.9 t of filter cake containing 30% of $H_2O$ were obtained. The filter cake was washed with 160 liters of water and then, after the addition of 570 kg of NaOH (30%), it was stirred for 3 hours at 90° C. The resulting suspension was filtered in a filter press. The resulting filter cake (40% $H_2O$) contained 4.2 t of solids having a content of approximately 94.5% $BaSO_4$, 1.6% $SrSO_4$, 0.72% $SiO_2$, 0.8% $Fe_2O_3$, and 0.4% CaO.

The product corresponded to a highly-enriched heavy spar and was used in the rotary furnace process for the preparation of BaS.

The filtrates collected from the two filtration steps and mixed with the respective wash solutions were mixed in a stirred vessel. The suspension was adjusted to pH 7 by addition of NaOH and was then dewatered by means of a filter press. 2.8 t of compact, moist filter cake containing 75% $H_2O$ were obtained. The solids consisted predominantly of iron (III) oxide, calcium oxide, silicon dioxide and aluminum oxide. This residue can be disposed of in a simple manner. Compared to the amount of residue initially supplied to the process, the amount of solid material to be disposed of was reduced by 82.5%.

The foregoing description and examples have been set forth merely to illustrate the invention and are not intended to be limiting. Since modifications of the described embodiments incorporating the spirit and substance of the invention may occur to persons skilled in the art, the invention should be construed to include all modifications and changes falling within the scope of the appended claims and equivalents.

What is claimed is:

1. A process for processing a waste leaching residue from barium sulfide leaching or strontium sulfide leaching to recover barium or strontium from said residue in the form of a solid containing barium sulfate or strontium sulfate, said process comprising reacting said waste leaching residue with
   a) an acid mixture formed by adding to a hydrochloric acid containing approximately 25 to 32% by weight of HCl a sulfuric acid containing approximately 80 to 100% by weight of $H_2SO_4$; or
   b) an initial hydrochloric acid containing approximately 25 to 32% by weight of HCl, and then subsequently adding to the initial hydrochloric acid a sulfuric acid containing approximately 80 to 100% by weight of $H_2SO_4$,
   at a temperature in the range from 60° C. to the boiling point of the reaction mixture to form an acid solution and a solid, whereby the hydrochloric acid is used in at least the quantity required to dissolve any calcium and any iron contained in said waste leaching residue; and separating said acid solution from said solid.

2. A process according to claim 1, wherein said reacting step is carried out at a temperature in the range from 65° C. to 100° C.

3. A process according to claim 1, further comprising treating the solid separated from the acid solution with an aqueous alkali solution to form an alkaline extract solution and an extraction residue, and separating the alkaline extract solution from the extraction residue.

4. A process according to claim 3, wherein said aqueous alkali solution is an aqueous sodium hydroxide solution containing sodium hydroxide in a quantity of between 1% by weight and the saturation limit.

5. A process according to claim 4, wherein said aqueous alkali solution is an aqueous sodium hydroxide solution containing from 15 to 50% by weight sodium hydroxide.

6. A process according to claim 3, wherein the treatment of the separated solid with an aqueous alkali solution is carried out at a temperature in the range from 50° C. up to the boiling point.

7. A process according to claim 3, further comprising mixing the separated acid solution with the separated alkaline extract solution.

8. A process according to claim 1, further comprising treating the solid separated from the acid solution with an aqueous alkali solution to form an alkaline extract solution and an extraction residue; separating the alkaline extract solution from the extraction residue; mixing the separated acid solution with the separated alkaline extract solution, and neutralizing and dewatering the mixed solution.

* * * * *